March 9, 1954  B. R. FIELD  2,671,819
LID OF ELECTRIC ACCUMULATORS
Filed July 30, 1951

Inventor
B. R. Field

Patented Mar. 9, 1954

2,671,819

UNITED STATES PATENT OFFICE 2,671,819

LID OF ELECTRIC ACCUMULATORS

Braham Rowley Field, Redditch, England, assignor to Alkaline Batteries Limited, Redditch, England, a British company Application July 30, 1951, Serial No. 239,312

Claims priority, application Great Britain August 10, 1950

3 Claims. (Cl. 136—170)

This invention relates particularly to the alkaline type of electric accumulator such as used for miners lamps and is concerned with the sealing of the accumulator vents, the covering in of the battery terminals and the locking or sealing of the lamp so that it cannot be interfered with.

Normally, miners' lamp batteries are locked or sealed by a lock or seal on the outside which is liable to damage. When unlocked the whole battery lid is removed or hinged back. In a number of cases miners' lamp batteries are charged with gassing valves closed by a spring or rubber seal, which opens when the pressure inside the cell rises sufficiently. The valves, therefore, are at opening pressure when in use and will leak electrolyte if the pressure is increased and the battery is turned on its side. Further, the terminals of miners' lamp batteries are usually unprotected, so that if the top is dented or damaged the terminals can also sustain damage and a possible short circuit could develop.

My invention provides an improved battery construction in which the normal service condition of the battery, the gassing valves are completely sealed, the battery is securely locked and the terminals shielded.

In accordance with my invention, the battery is sealed, locked and protected by an auxiliary lid made in two parts, the outer part being domed and designed for strength and the inner part carrying a sealing pad for the cell vents and bushes or housings to cover in the cell terminals. Between the two parts is arranged and secured a magnetic lock for a headed peg or catch on the battery so that the lid is secured thereto by the lock.

The two parts of the lid are welded or brazed together.

The auxiliary lid is hinged to the main lid so that by opening the auxiliary lid, only part of the battery is exposed; the inter-cell connectors, the fuse assembly and the cable intake still remain covered. When the auxiliary lid is open, the vents are opened and the terminals exposed so that the battery can be charged.

The magnetic lock is located in the auxiliary lid and operated to open it by the application of an external magnetic force.

Referring to the accompanying explanatory drawings.

The battery has a main lid $a$ with openings giving access to the four gassing valves $b$, terminals $c$ and catch $d$ for a magnetic lock. A hinge $e$ connects the inner part $f$ of an auxiliary lid to the main lid $a$. The outer part $g$ of the auxiliary lid is domed and designed for strength, and the two parts are brazed or welded together along a flange $h$ formed on the outer part. The inner part $f$ encloses a magnetic lock $i$, a seating pad $j$ and two insulated terminal bushes $k$.

Figure 1:
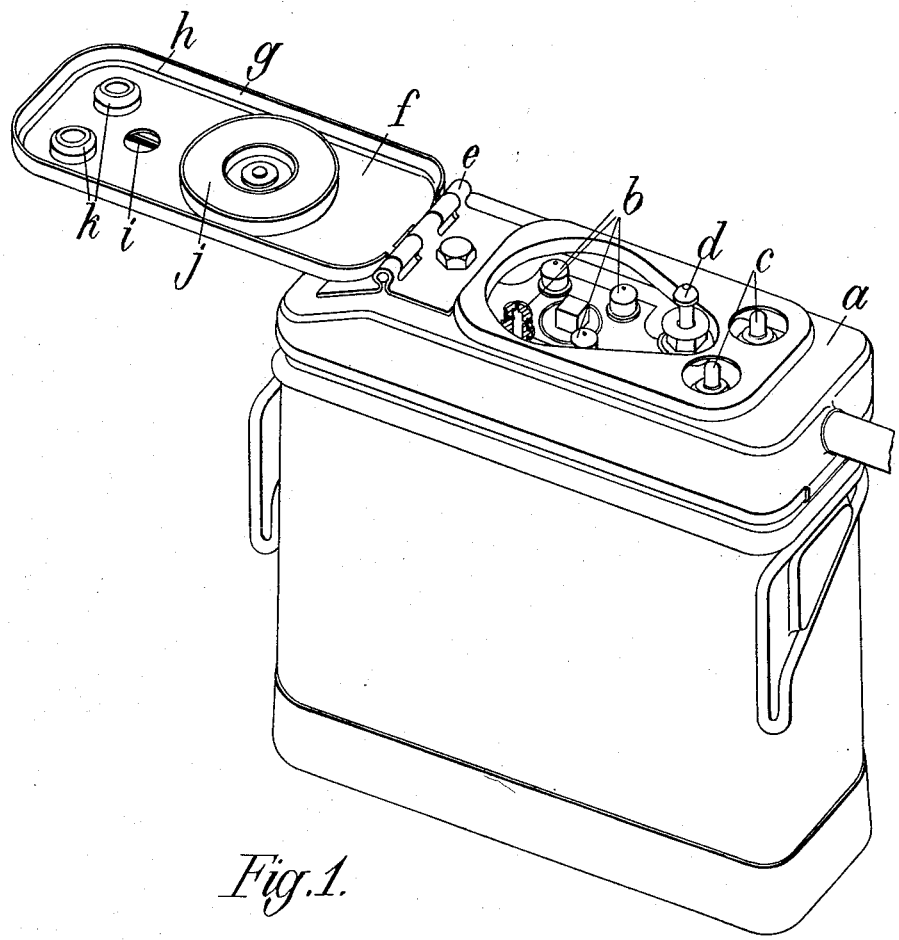
Figure 1 shows in perspective a four cell battery with lid in accordance with the invention, the auxiliary lid being open.
Figure 2:
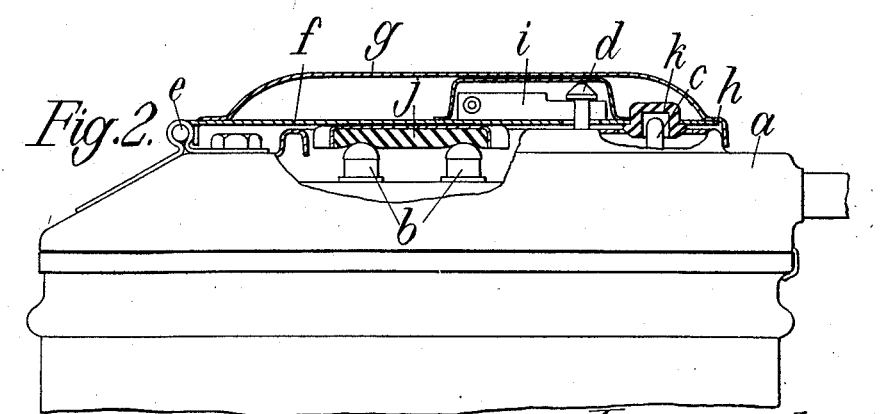
Figure 2 shows the lid arrangement in section.

When the auxiliary lid is open as in Figure 1, the valves $b$ are open and the terminals $c$ are exposed so that the battery can be charged. The inter-cell connectors, the fuse assembly and the cable intake are still enclosed by the main lid $a$. In the closed position shown in Figure 2, the valves $b$ are closed by the pad $j$ and the terminals $c$ are shielded by the bushes $k$. The magnetic lock is protected by the domed lid part $g$.

What I claim is:

1. An electric storage battery, comprising a container having at least one cell compartment, a cell cover sealed in the container, cell vents and charging terminals projecting from the cell cover, a main lid covering the battery and having openings giving access to the cell vents and terminals, an auxiliary lid consisting of two parts of which the outer part is domed and designed for strength, a sealing pad for the cell vents and housings for covering the cell terminals, carried by the inner part of the auxiliary lid, and means for securing the auxiliary lid over the main lid.

2. A protective means for an electric storage battery comprising a cover that encases the inter-cell connectors, fuse assembly, and cable intake and connections and provides access to the vents and charging terminals, a further portion of the protective means being formed of two elements, an inner element carrying means to positively seal the cell vents and carrying cup shaped insulated bushings to enclose the charging terminals, and an outer element engaging said cover, the outer element being domed outwardly to provide a shield for said inner element whereby a heavy blow on the outer element will be transmitted to the cover element along a line remote from the location of attachment of the vent sealing means and of the cup shaped bushings to the inner element.

3. The device of claim 2 in which the portion of the protective means that is formed of two elements is hinged to the cover portion of the protective means.

BRAHAM ROWLEY FIELD.

References Cited in the file of this patent

UNITED STATES PATENTS

| Number | Name | Date |
|---|---|---|
| 1,022,073 | Gottschalck | Apr. 2, 1912 |
| 1,321,960 | Wheat | Nov. 18, 1919 |
| 1,756,072 | Smith | Apr. 29, 1930 |
| 1,765,027 | Mitchell | June 17, 1930 |
| 2,318,371 | Bushman | May 4, 1943 |
| 2,592,207 | Stamper | Apr. 8, 1952 |